United States Patent
Dange

(10) Patent No.: US 10,237,311 B2
(45) Date of Patent: Mar. 19, 2019

(54) METHODS AND SYSTEMS FOR CONTROLLING ACCESS TO PRESENTATION DEVICES USING SELECTION CRITERIA

(71) Applicant: FACEBOOK, INC., Menlo Park, CA (US)

(72) Inventor: Amod Ashok Dange, Mountain View, CA (US)

(73) Assignee: FACEBOOK, INC., Menlo Park, CA (US)

(*) Notice: Subject to any disclaimer, the term of this patent is extended or adjusted under 35 U.S.C. 154(b) by 207 days.

(21) Appl. No.: 15/285,384

(22) Filed: Oct. 4, 2016

(65) Prior Publication Data

US 2018/0097856 A1 Apr. 5, 2018

(51) Int. Cl.
| | | |
|---|---|---|
| *G06F 15/16* | (2006.01) | |
| *H04L 29/06* | (2006.01) | |
| *H04L 29/08* | (2006.01) | |
| *G06Q 50/00* | (2012.01) | |
| *H04L 12/18* | (2006.01) | |
| *H04L 12/58* | (2006.01) | |

(52) U.S. Cl.
CPC .......... *H04L 65/403* (2013.01); *G06Q 50/00* (2013.01); *H04L 12/1818* (2013.01); *H04L 65/1069* (2013.01); *H04L 67/10* (2013.01); *H04L 51/32* (2013.01)

(58) Field of Classification Search
USPC ................ 709/204, 205, 206, 219, 226, 229
See application file for complete search history.

(56) References Cited

U.S. PATENT DOCUMENTS

| | | | | |
|---|---|---|---|---|
| 8,549,076 | B2* | 10/2013 | Mizrahi | A63F 13/10 709/205 |
| 2004/0131187 | A1* | 7/2004 | Takao | H04L 63/0428 380/255 |
| 2005/0175027 | A1* | 8/2005 | Miller | H04L 47/15 370/458 |
| 2007/0201659 | A1* | 8/2007 | Altberg | H04M 3/42008 379/201.01 |
| 2008/0263458 | A1* | 10/2008 | Altberg | H04L 12/66 715/757 |
| 2011/0150200 | A1* | 6/2011 | Uhler | H04M 3/56 379/202.01 |
| 2012/0245936 | A1* | 9/2012 | Treglia | G06F 17/30746 704/235 |
| 2016/0014564 | A1* | 1/2016 | Del Vecchio | G08G 1/20 455/456.2 |
| 2016/0149968 | A1* | 5/2016 | Yin | H04L 65/80 709/204 |

* cited by examiner

*Primary Examiner* — Liang Che A Wang
(74) *Attorney, Agent, or Firm* — Morgan, Lewis & Bockius LLP

(57) ABSTRACT

Methods, systems, and/or devices for controlling access to and presenting content on presentation devices based on selection criteria are described herein. In one aspect, a server system receives requests to access a presentation device from a plurality of user devices. A request corresponding to a user device of the plurality of user devices is selected based on one or more selection criteria. Access to the presentation device is granted to the user device of the plurality of user devices, in response to selecting the request. After granting access to the user device, a data stream that includes vocals is received from the user device. The data stream is transmitted to the presentation device for presentation.

17 Claims, 6 Drawing Sheets

METHODS AND SYSTEMS FOR CONTROLLING ACCESS TO PRESENTATION DEVICES USING SELECTION CRITERIA

TECHNICAL FIELD

The disclosed implementations relate generally to content presentation, and, in particular, to controlling access to and presenting content on presentation devices based on selection criteria.

BACKGROUND

Open forum events provide a productive means by which individuals within communities can discuss subjects of public or private interest. The advent of electronic presentation devices, such as public address systems that use microphones and loudspeakers to project speech, has helped to ensure that communications during these events are clearly presented.

At events that employ such technologies, however, organizers often struggle with the logistics of handing off a microphone to attendees who wish to speak or ask questions. Difficulties also arise in fairly granting speaking privileges on a first-come basis. Matters are further complicated when some attendees remotely participate from a location removed from the physical premises at which an event is held.

SUMMARY

Accordingly, there is a need for devices, systems, and methods for controlling access to and presenting content on presentation devices based on selection criteria. A user device of a plurality of devices requesting access to a presentation device is granted access based on selection criteria. An audio data stream that includes user vocals captured with a microphone of the user device may then be transmitted for presentation by the presentation device. Users are therefore able to more efficiently and effectively access and present content on a presentation device.

In accordance with some implementations, a method is performed at a server system (e.g., a server hosting an online Q&A event) having one or more processors and memory storing instructions for execution by the one or more processors. The method includes receiving requests to access a presentation device from a plurality of user devices. A request corresponding to a user device of the plurality of user devices is selected based on one or more selection criteria. Access to the presentation device is granted to the user device of the plurality of user devices, in response to selecting the request. After granting access to the user device, a data stream that includes vocals is received from the user device. The data stream is transmitted to the presentation device for presentation.

In accordance with some implementations, a server system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the server system, cause the presentation device to perform the operations of the method described above.

Thus, devices are provided with efficient, user-friendly methods for controlling access to and presenting content on presentation devices.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first data stream could be termed a second data stream, and, similarly, a second data stream could be termed a first data stream, without departing from the scope of the various described implementations. The first data stream and the second data stream are both data streams, but they are not the same data stream.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
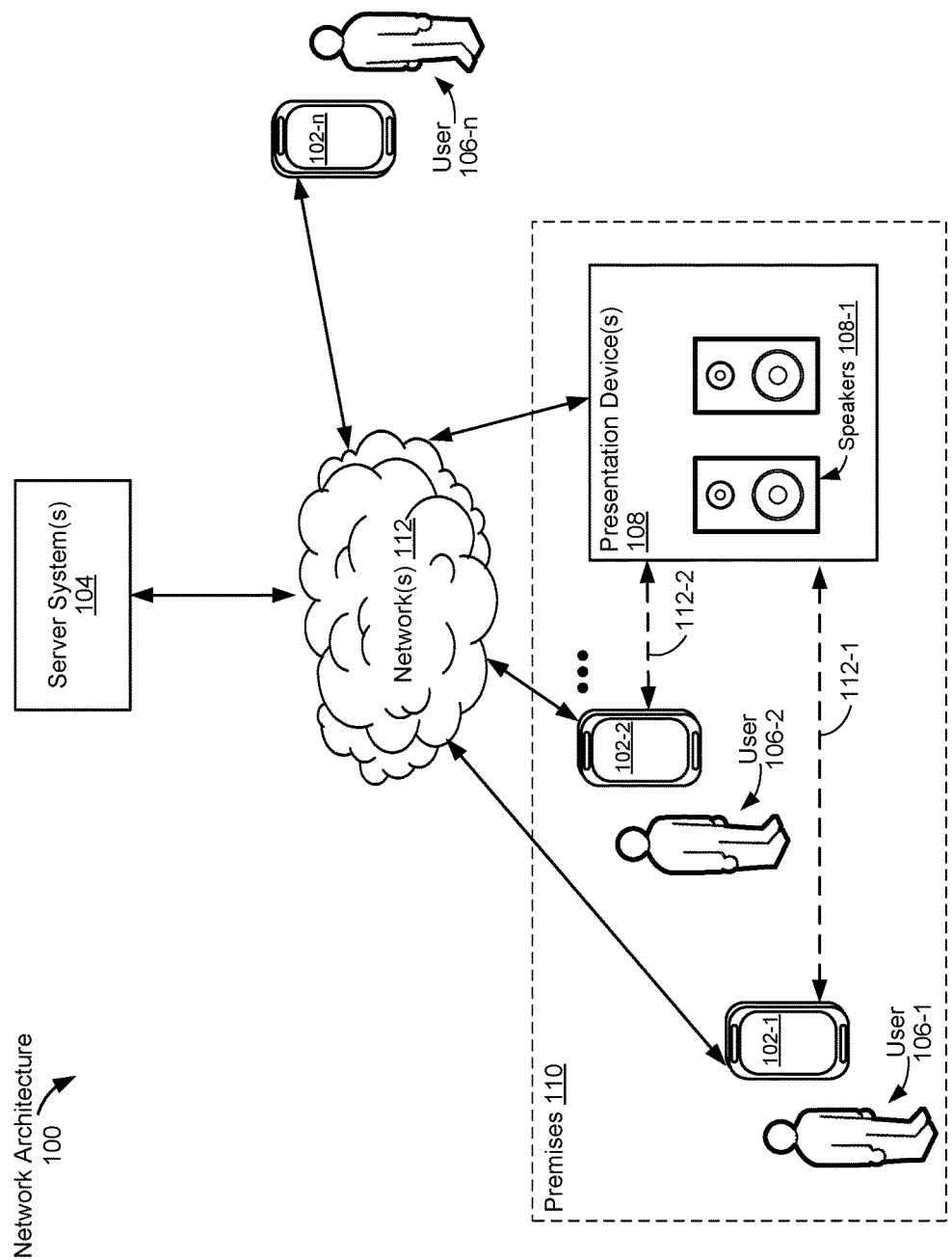
FIG. 1 is a block diagram illustrating an exemplary network architecture in accordance with some implementations.

FIG. 1 is a block diagram illustrating an exemplary network architecture 100 in accordance with some implementations. The network architecture 100 includes one or more user devices 102-1 . . . 102-n (where n is an integer greater than or equal to one), one or more server systems 104, and one or more presentation devices 108, which may include a speaker 108-1, a display device (not shown), and/or other presentation devices (e.g., a user device 102-n). One or more networks 112 communicably connect each component of the network architecture 100 with other components of the network architecture 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

A user device 102 (e.g. 102-1, 102-2, . . . 102-n) is associated with one or more users 106 (e.g., 106-1, 106-2, . . . 106-n). In some implementations, a user device 102 is a personal computer, a mobile electronic device, a wearable computing device, a laptop, a tablet computer, a mobile phone, a feature phone, a smart phone, a digital media player, or any other device capable of capturing and/or transmitting data. In some implementations, user devices 102 include input devices for receiving user inputs (e.g., microphones for recording vocal input from a user speaking, which the user devices may store and/or transmit to other components of the network architecture 100, such as the server system 104, presentation device 108, other user devices 102, etc.). User devices 102 may be the same type of device (e.g., all mobile devices), or may comprise different types of devices.

Users 106 employ user devices 102 to participate in an online service or feature (e.g., provided by server system 104, presentation device 108, etc.). For example, one or more of the user devices 102-1, 102-2, . . . 102-n execute web browser applications that can be used to access a social-networking service hosted by the server system 104. One or more of the user devices 102-1, 102-2, . . . 102-n may execute software applications that are specific to the social-networking service (e.g., social-networking "apps" running on smart phones or tablets, such as a Facebook social-networking application running on an iPhone, Android, or Windows smart phone or tablet).

Users 106 interacting with the user devices 102 can participate in the social-networking service provided by the server system 104 by posting information (e.g., items of content), such as text comments (e.g., updates, announcements, replies), digital photos, videos, audio files, links, and/or other electronic content. Users interacting with the user devices 102 can also use the social-networking service provided by the server system 104 to communicate and collaborate with each other. User information may be maintained by (e.g., stored within databases of) the social-networking service, such as user profiles, biographical data, login information, privacy and other preferences, and the like. In some embodiments, for a given user, user information includes the user's name, profile picture, contact information, birth date, sex, marital status, family status, employment, education background, preferences, interests, and/or other demographic information.

The server system 104 may also provide services or features through which users 106 (e.g., users of a social-networking service) may participate in online discussions with one another (e.g., an online questions and answers (Q&A) event, a web forum, a web conference, a social event, etc.). Users 106 may, for example, participate in a discussion by using the capture functionalities of user devices 102 (e.g., microphone, camera, etc.). User vocals captured with a microphone of a user device, for example, may be presented to other participants via the speakers 108-1 of presentation device 108. Here, the server system 104 may moderate the discussion by granting or denying users access to the presentation device 108 based on their position in an access queue (e.g., access is granted to a user device that is first in access queue 324, FIG. 5) and/or other optional information (e.g., user profiles indicating the priority of a requesting user, message content received with the requests, etc.). As described in greater detail throughout, the server system 104 may also facilitate transmission of (e.g., receive a data stream from a user device 102 and transmit the data stream to a presentation device 108) and/or perform additional processing on (e.g., transcribing audio data stream) data streams to be presented on a presentation device 108. In some embodiments, user information maintained by a social-networking service provided by the server system 104 is accessible and may be presented in connection with other services or features provided by the server system 104 (e.g., displaying user profile information while the user is granted access to the presentation device 108).

In some embodiments, the server system 104 stores and provides content (via the network(s) 112) to the presentation devices 108 (and the presentation devices 108 receive content from the server system 104 via the network(s) 112). Content stored and served by the server system 104, in some implementations, includes audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed).

The description of the server system 104 as a "server" is intended as a functional description of the devices, systems, processor cores, and/or other components that provide the functionality attributed to the server system 104. It will be understood that the server system 104 may be a single server computer or multiple server computers. The server system 104 may be coupled to other servers and/or server systems, or other devices, such as other user devices, databases, content delivery networks (e.g., peer-to-peer networks), network caches, and the like. In some implementations, the server system 104 is implemented by multiple computing devices working together to perform the actions of a server system (e.g., cloud computing). Furthermore, any functionalities performed by the server system 104 may also be performed additionally, alternatively, and/or concurrently by the one or more presentation devices 108.

Presentation devices 108 (e.g., speaker 108-1, display device, etc.) are capable of receiving and presenting content (e.g., data streams including audio, video, etc.; user profile information; transcriptions; etc.). For example, in some implementations, speaker 108-1 is a component of a network-connected audio/video system (e.g., a public address (PA) system). In some implementations, the server system 104 and/or user devices 102 can send content to presentation devices 108 for presentation (e.g., video, audio including user vocals, etc.). Presentation devices include computers, dedicated media players, network-connected stereo and/or speaker systems, public address systems, network-connected vehicle media systems, network-connected televisions, network-connected DVD players, and universal serial bus (USB) devices with network connectivity that provide playback, and the like. In some implementations, user devices 102 may be presentation devices 108 (e.g., user device 102-n is a mobile phone that plays audio from a live web forum hosted at premises 110).

One or more user devices 102 (and associated users 106) and/or presentation devices 108 may be located within the same or different physical premises 110. Premises 110 may correspond to a particular location, a particular region of a particular location (e.g., a room), or any other pre-defined geographical region or collection of regions (e.g., a geofence defining a virtual area). In some embodiments, in connection with a service or feature provided by the server system 104 (e.g., an online Q&A event hosted by a social-networking service), a subset of user devices 102 requesting access to a presentation device 108 are associated with a first location (e.g., a premises 110), while a remaining subset of the user devices requesting access are associated with a location distinct and remote from the first location.

User devices 102, the server system 104, and presentation devices 108 may be communicably coupled in a variety of ways. In some implementations, multiple user devices 102 send requests to access a presentation device 108 (e.g., to present user vocals) to a server system 104 via a network 112. In response to receiving the access requests, the server system 104 may select a request and grant access to the presentation device 108 to a corresponding user device. After granting access, the server system 104 may receive a data stream (e.g., audio data stream that includes user vocals) from the user device granted access, which the server system then transmits to the presentation device 108 via the network 112 for presentation.

Additionally and/or alternatively, user devices 102 transmit content (e.g., audio data stream that includes user vocals) to presentation devices 108 directly through one or more wired (e.g., auxiliary cable, USB, etc.) and/or wireless (e.g., BLUETOOTH/BLE) communication technologies, radio-frequency-based near-field-communication (NFC) technologies, infrared communication technologies, or other close-range wireless communications protocols) communications channels (e.g., 112-1, 112-2, etc.). In some implementations, for example, a data stream is transmitted from a user device 102-1 to the presentation device 108 via communications channel 112-1, but not through the server system 104.

In some implementations, each presentation device 108 is associated with an identifier (e.g., a unique hardware or application identifier, a network address, etc.) that the server system 104 uses to identify and/or establish communications with the presentation device. In some implementations, a user device 102 sends, to the server system 104, a request for access that includes information specifying (or that may be used to identify) a particular presentation device 108. Such information identifying a presentation device 108 may be retrieved when a requesting user device 102 participates in an online service or feature (e.g., provided by the server system 104). For example, an identifier for a presentation device 108 is provided to participating user devices 102 upon commencing participation in a Q&A event hosted by a social-networking service.

Figure 2:
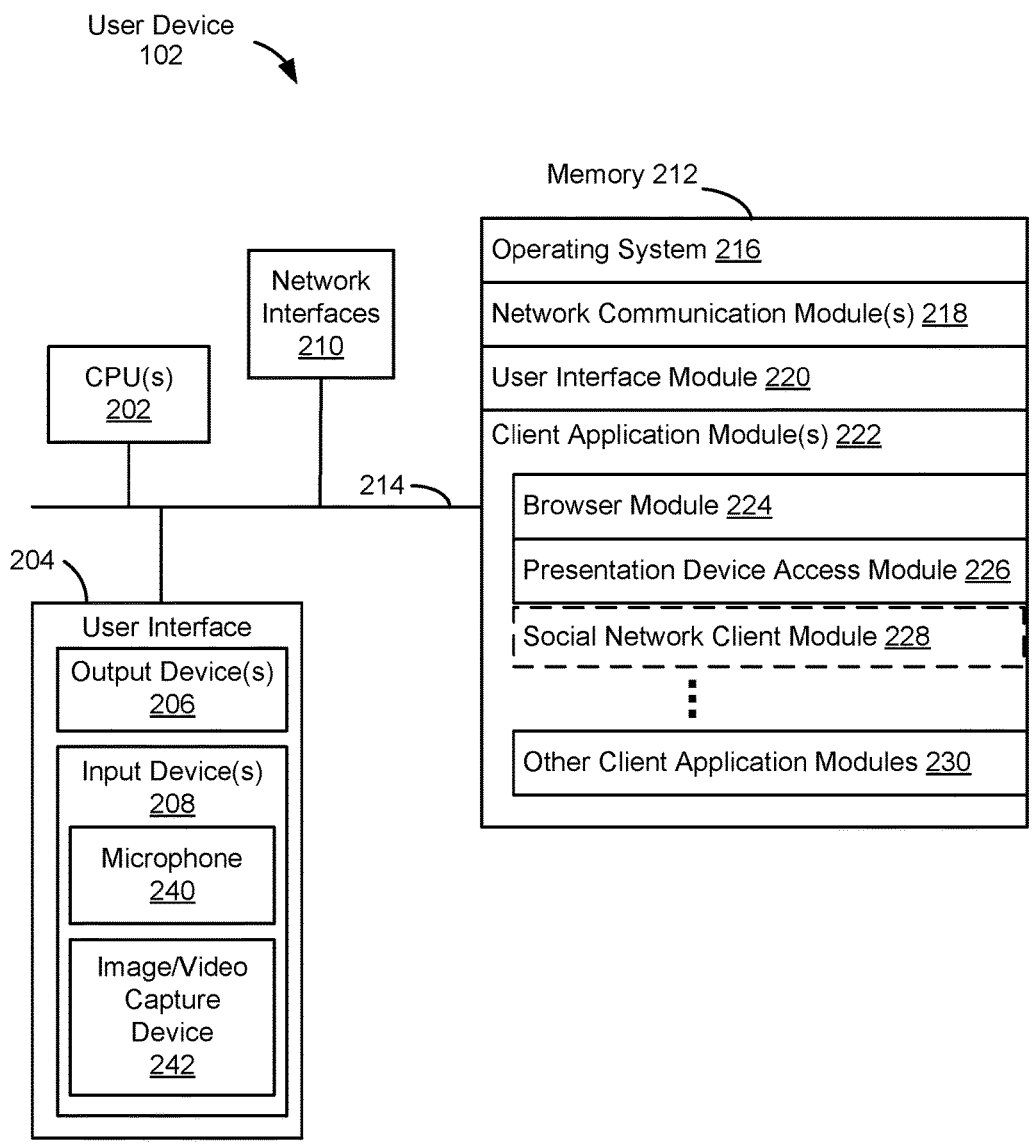
FIG. 2 is a block diagram illustrating an exemplary user device in accordance with some implementations.

FIG. 2 is a block diagram illustrating an exemplary user device 102 (e.g., 102-1, 102-2, . . . 102-n, FIG. 1) in accordance with some implementations. The user device 102 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the user device 102 includes a user interface 204, including output device(s) 206 and input device(s) 208. In some implementations, the input devices 208 include a keyboard or track pad. Alternatively, or in addition, the user interface 204 includes a display device that may include a touch-sensitive surface, in which case the display device is a touch-sensitive display. In user devices that have a touch-sensitive display, a physical keyboard is optional (e.g., a soft keyboard may be displayed when keyboard entry is needed). The user device 102 includes one or more audio input devices (e.g., a microphone 240) to capture audio (e.g., user vocals). Optionally, the user device 102 includes an image/video capture device 242, such as a camera or webcam. The output devices 206 may include speakers or an audio output connection (i.e., audio jack) connected to speakers, earphones, or headphones. Furthermore, some user devices 102 use a microphone (e.g., 240) and voice recognition device to supplement or replace the keyboard. Optionally, the user device 102 includes a location-detection device, such as a GPS (global positioning satellite) or other geo-location receiver, and/or location-detection software for determining the location of the user device 102.

In some implementations, the one or more network interfaces 210 include wireless and/or wired interfaces for receiving data from and/or transmitting data to other user devices 102, presentation devices 108, a server system 104, and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 210 may include a Bluetooth interface for enabling wireless data communications with other user devices 102, presentation devices 108, and/or or other Bluetooth-compatible devices (e.g., for sending audio data for user vocals to the presentation devices 108). Furthermore, in some implementations, the one or more network interfaces 210 includes a wireless LAN (WLAN) interface for enabling data communications with other WLAN-compatible devices (e.g., a presentation device 108) and/or the server system 104 (via the one or more network(s) 112, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the user device 102 to other computing devices (e.g., user devices 102, presentation devices 108, server system 104, and/or other devices) via the one or more network interface(s) 210 (wired or wireless);
- a user interface module 220 that receives commands and/or inputs from a user via the user interface 204 (e.g., from input devices 208, such as microphone 240 and/or image/video capture device 242), and provides outputs for playback and/or display by the user interface 204 (e.g., the output devices 206); and
- one or more client application modules 222, including the following modules (or sets of instructions), or a subset or superset thereof:
  - a web browser module 224 (e.g., Internet Explorer by Microsoft, Firefox by Mozilla, Safari by Apple, or Chrome by Google) for accessing, viewing, and interacting with web sites (e.g., a social-networking web site provided by the server system 104),
  - a presentation device access module 226 for accessing and providing content (e.g., by sending access requests to a server system 104, and once access is granted, transmitting an audio data stream including user vocals recorded by a microphone 240) for presentation on a presentation device 108 (FIG. 4) (e.g., in connection with a live Q&A event hosted by server system 104);
  - an optional social network module 228 for providing an interface to a social-networking service (e.g., a social-networking service provided by server system 104) and related features; and/or
  - other optional client application modules 230, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
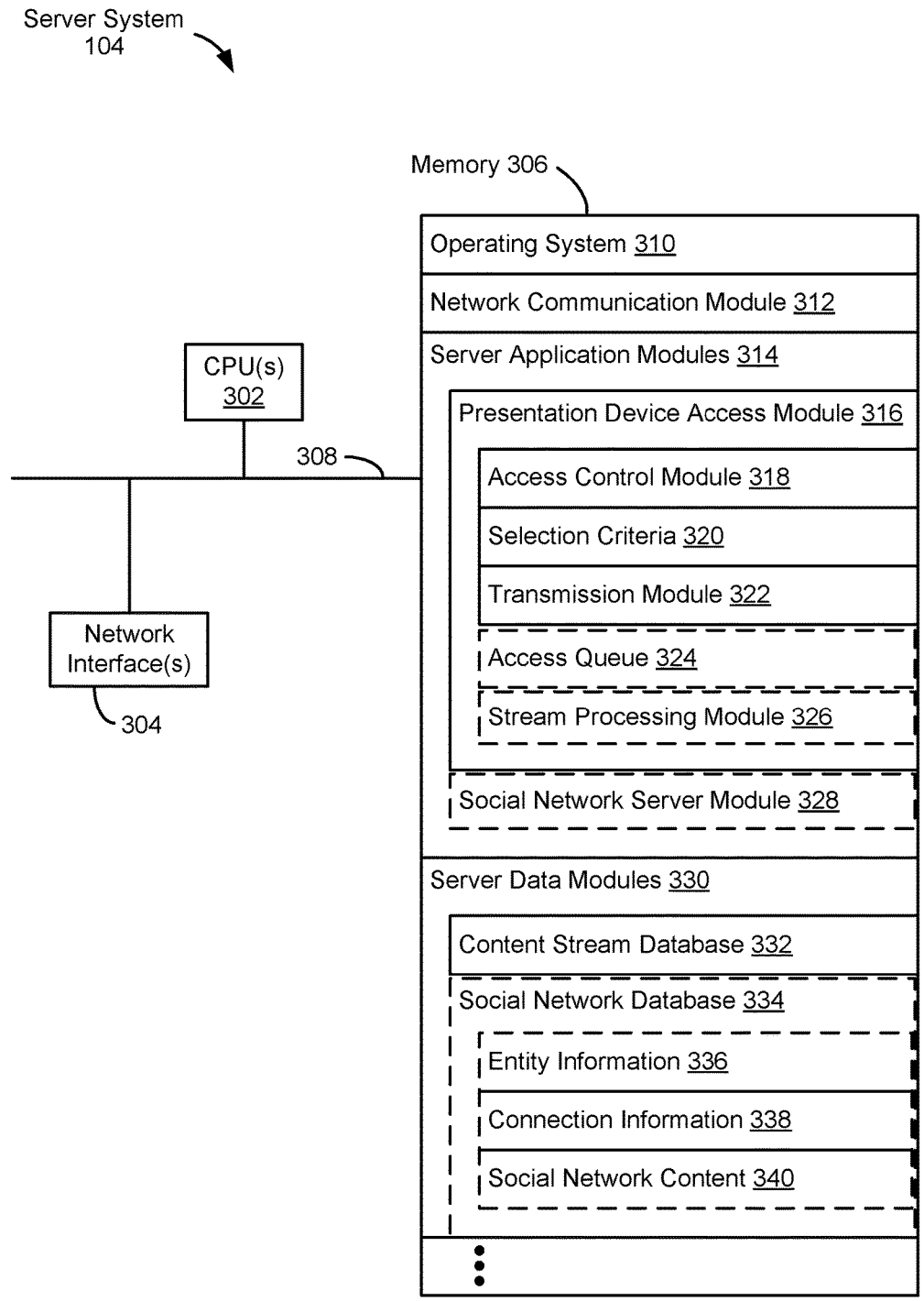
FIG. 3 is a block diagram illustrating an exemplary server system in accordance with some implementations.

FIG. 3 is a block diagram illustrating an exemplary server system 104 in accordance with some implementations. The server system 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

- an operating system 310 that includes procedures for handling various basic system services and for performing hardware dependent tasks;
- a network communication module 312 that is used for connecting the server system 104 to other computing devices (e.g., user devices 102, presentation devices 108, etc.) via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;
- one or more server application modules 314 for enabling the server system 104 to perform various functions, the server application modules 314 including, but not limited to, one or more of:
  - a presentation device access module 316 for providing services and related features for facilitating user communications and presentation of content (e.g., granting user devices 102 access to a presentation device 108 during a live Q&A event) (e.g., in conjunction with browser module 224, a presentation device access module 226, and/or a social network client module 228 on the user device 102, FIG. 3), which includes:
    - an access control module 318 for receiving access requests (e.g., from user devices 102, FIG. 1) and controlling (e.g., granting, denying, revoking, etc.) access to devices (e.g., presentation devices 108) in accordance with selection criteria 320;
    - selection criteria 320 that specify rules or conditions (e.g., first access request in an access queue 324; a blacklist of user devices disqualified from subsequent access; etc.) for selecting received access requests in order to control access to corresponding user devices;
    - a transmission module 322 for receiving (e.g., from user devices 102) and transmitting (e.g., to presentation devices 108) streams of data (e.g., audio that includes user vocals);
    - an optional access queue 324 (FIG. 5) for monitoring an order in which access requests (e.g., from user devices 102) are received; and
    - an optional stream processing module 326 for processing received streams of data to modify and/or produce additional data (e.g., transcriptions of received audio streams; language translations of received audio streams; etc.);
  - an optional social network server module 328 for providing social-networking services and related features; and one or more server data module(s) 330 for handling the storage of and access to content, including but not limited to:
- a content stream database 332 storing streams of data (e.g., audio including user vocals, received from a user device 102); and
- an optional social network database 334 storing data associated with an optional social-networking service, such as entity information 336, connection information 338, and social network content 340.

The optional social network database 334 stores data associated with the social network in one or more types of databases, such as graph, dimensional, flat, hierarchical, network, object-oriented, relational, and/or XML databases.

In some embodiments, the social network database 334 includes a graph database, with entity information 336 represented as nodes in the graph database and connection information 338 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients (e.g., user devices 102) on corresponding profile pages or other pages in the social-networking service. In some embodiments, the nodes also include pointers or references to other objects, data structures, or resources for use in rendering content in conjunction with the rendering of the pages corresponding to the respective nodes at clients (e.g., user devices 102).

Entity information 336 includes user information, such as user profiles, login information, privacy and other preferences, biographical data, and the like. In some embodiments, for a given user, the user information includes the user's name, profile picture, contact information, birth date, sex, marital status, family status, employment, education background, preferences, interests, and/or other demographic information.

In some embodiments, entity information 336 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 336 includes information about a resource, such as an audio file, a video file, a digital photo, a text file, a structured document (e.g., web page), or an application. In some embodiments, the resource is located in the social-network system 108 (e.g., in social network content 340) or on an external server, such as third-party server.

In some embodiments, connection information 338 includes information about the relationships between entities in the social network database 334. In some embodiments, connection information 338 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the server system 104 transmits a "friend request" to the second user. If the second user confirms the "friend request," the server system 104 creates and stores an edge connecting the first user's user node and the second user's user node in a graph database as connection information 338 that indicates that the first user and the second user are friends. In some embodiments, connection information 338 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the server system 104 may create a "like" edge, "check in" edge, or a "favorites" edge in response to the corresponding user action. As another example, the user may listen to a particular song using a particular application (e.g., an online music application). In this case, the server system 104 may create a "listened" edge and a "used" edge between the user node that corresponds to the user and the entity nodes that correspond to the song and the application, respectively, to indicate that the user listened to the song and used the application. In addition, the server system 104 may create a "played" edge between the entity nodes that correspond to the song and the application to indicate that the particular song was played by the particular application.

In some embodiments, social network content 340 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, social network content 340 includes executable code (e.g., games executable within a browser window or frame), podcasts, links, and the like.

In some implementations, the server system 104 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 104 in accordance with some implementations, FIG. 3 is intended more as a functional description of the various features that may be present in one or more server systems than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the server system 104, and how features are allocated among them, will vary from one implementation to another and, optionally, depends in part on the amount of data traffic that the server system handles during peak usage periods as well as during average usage periods.

Figure 4:
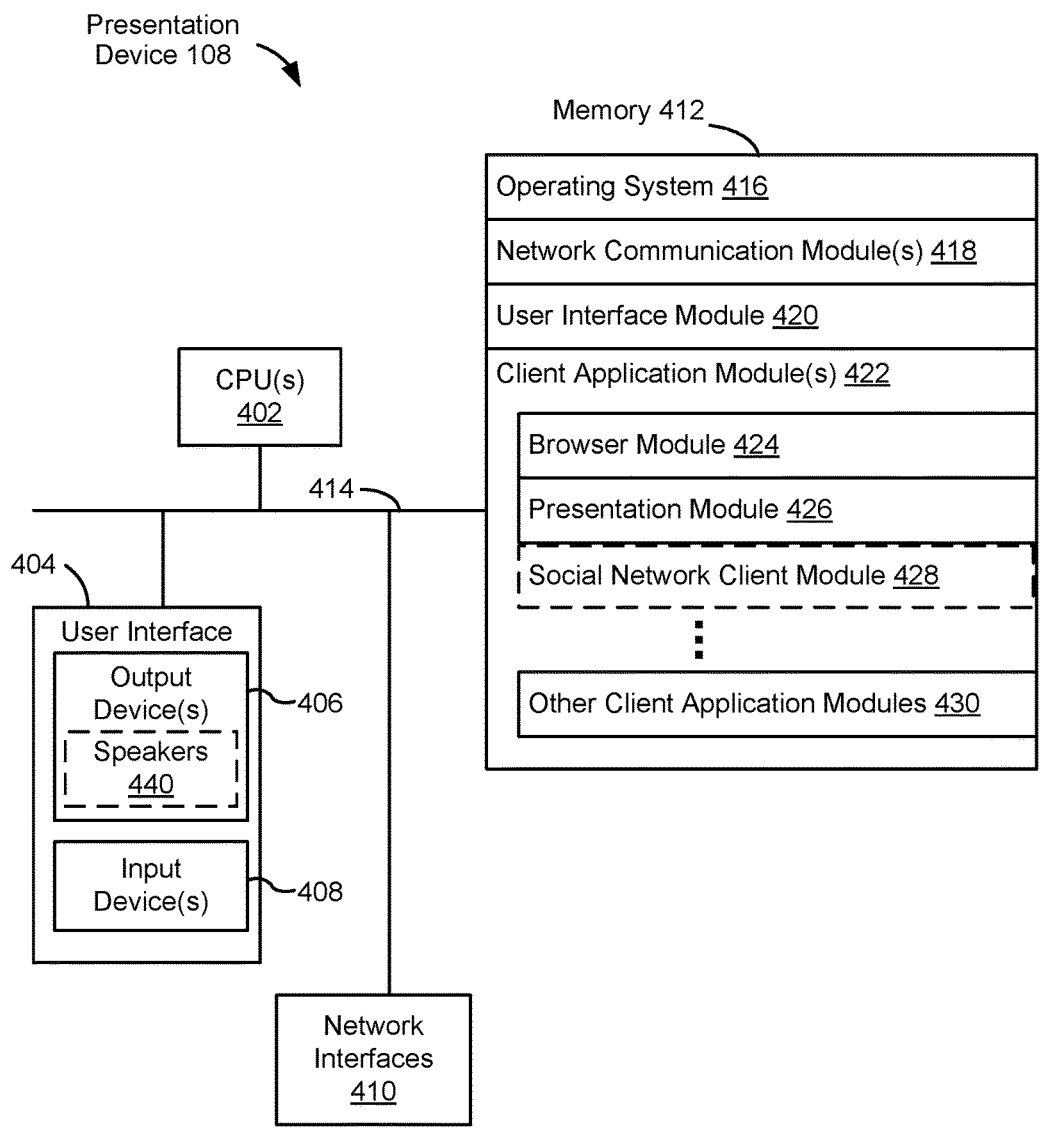
FIG. 4 is a block diagram illustrating an exemplary presentation device in accordance with some implementations.

FIG. 4 is a block diagram illustrating an exemplary presentation device 108 in accordance with some implementations. The presentation device 108 typically includes one or more central processing units (CPU(s), e.g., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

As also shown in FIG. 4, the presentation device 108 includes a user interface 404, including output device(s) 406 and input device(s) 408. In some implementations, the input devices include buttons, a keyboard, and/or track pad. Alternatively, or in addition, the user interface 404 includes a display device that may include a touch-sensitive surface, in which case the display device is a touch-sensitive display. The output devices (e.g., output device(s) 406) include optional speakers 440 and/or an audio output connection (i.e., audio jack) connected to speakers, earphones, or headphones. Optionally, the presentation device 108 includes a location-detection device, such as a GPS (global positioning satellite) or other geo-location receiver, and/or location-detection software for determining the location of the presentation device 108.

In some implementations, the one or more network interfaces 410 include wireless and/or wired interfaces for receiving data from and/or transmitting data to other presentation devices 108, user devices 102, a server system 104, and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 410 include a Bluetooth interface for enabling wireless data communications with other user devices 102, presentation devices 108, and/or or other Bluetooth-compatible devices (e.g., for receiving audio data for user vocals from a user device 102). Furthermore, in some implementations, the one or more network interfaces 410 includes a wireless LAN (WLAN) interface for enabling data communications with other WLAN-compatible devices (e.g., user devices 102, other presentation devices 108, etc.) and/or the server system 104 (via the one or more network(s) 112, FIG. 1).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:
  an operating system 416 that includes procedures for handling various basic system services and for performing hardware dependent tasks;
  network communication module(s) 418 for connecting the presentation device 108 to other computing devices (e.g., user devices 102, presentation devices 108, a server system 104, and/or other devices) via the one or more network interface(s) 410 (wired or wireless);
  a user interface module 420 that receives commands and/or inputs from a user via the user interface 404 (e.g., from the input devices 408), and provides outputs for playback and/or display on the user interface 404 (e.g., the output devices 406, such outputting audio using speakers 440, presenting video/image data using a display device, etc.);
  one or more client application modules 422, including the following modules (or sets of instructions), or a subset or superset thereof:
    a web browser module 424 (e.g., Internet Explorer by Microsoft, Firefox by Mozilla, Safari by Apple, or Chrome by Google) for accessing, viewing, and interacting with web sites (e.g., a social-networking web site provided by the server system 104),
    a presentation module 426 for presenting content received from devices and/or systems (e.g., in connection with a live Q&A event hosted by server system 104, playing an audio data stream including user vocals received recorded by user device 102 and received from the server system 104);
    an optional social network module 428 for providing an interface to a social-networking service (e.g., a social-networking service provided by server system 104) and related features; and/or
    other optional client application modules 430, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the presentation device 108 is a type of user device 102, and includes some or all of the same components, modules, and sub-modules as described above in FIG. 2 with respect to the user device 102.

Each of the above identified modules stored in memory 212, 306, and 412 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212, 306, and 412 optionally store a subset or superset of the respective modules and data structures identified above. Furthermore, memory 212, 306, and 412 optionally store additional modules and data structures not described above.

Figure 5:
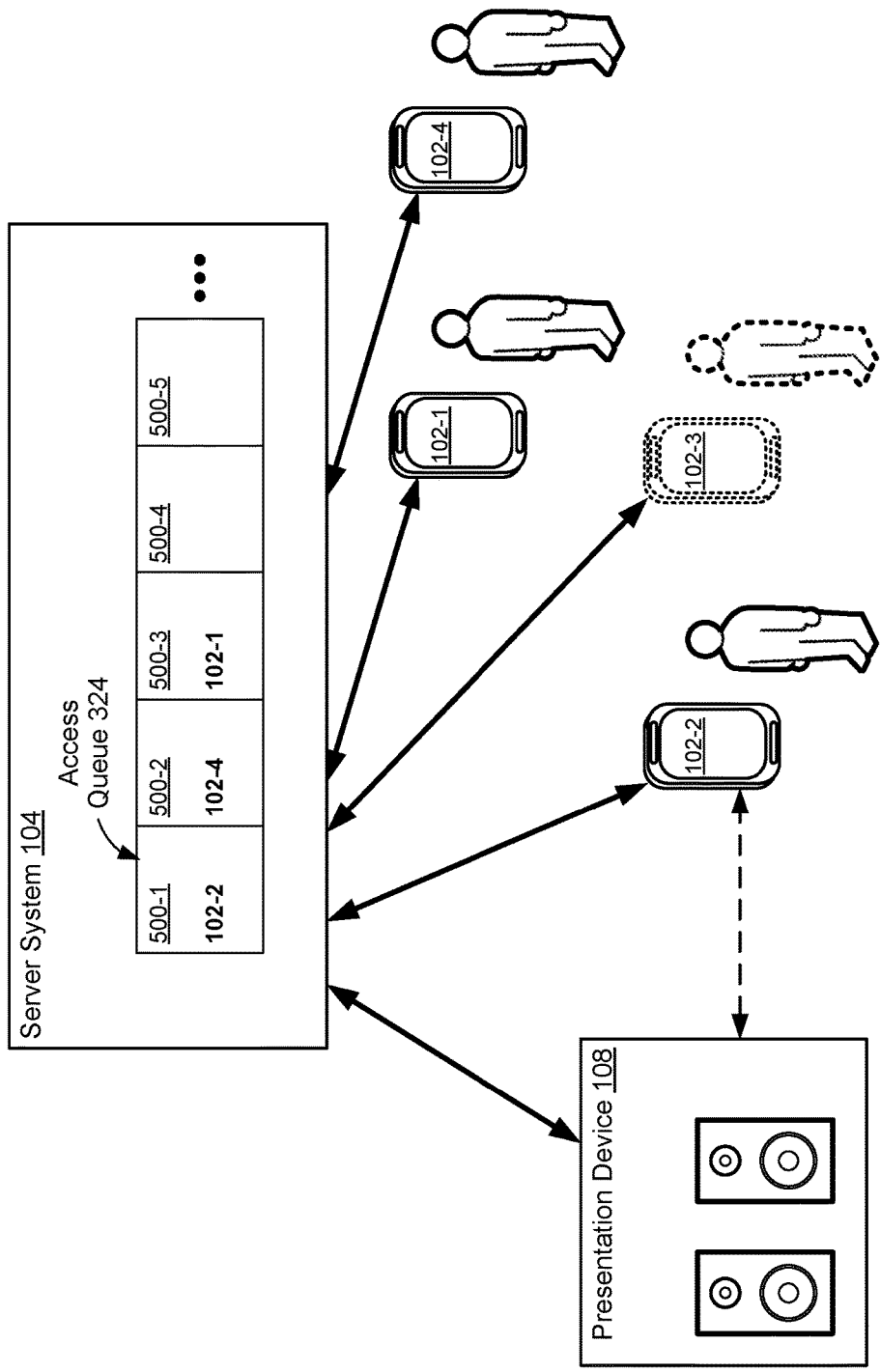
FIG. 5 illustrates an exemplary network environment in which user devices request access to a presentation device in accordance with some implementations.

FIG. 5 illustrates an exemplary network environment in which user devices 102 request access to a presentation device 108 in accordance with some implementations.

In the example shown, users associated with user devices 102-1 through 104 are participating in a service provided by the server system 104, such as a live Q&A event hosted online. To participate in the Q&A event, users may employ user devices 102 to access the presentation device 108 in order to speak and engage in discussions with other participants. For example, users may submit access requests using their user device 102 (e.g., selecting a user-interface affordance displayed within a presentation device access module 226), and if granted access, users may provide an input (e.g., a text input, a vocal input through a microphone of the user device, etc.) for presentation on the presentation device 108.

As described in greater detail throughout, in some embodiments, user devices 102 requesting access are granted or denied access to the presentation device 108 based on predefined selection criteria and an optional access queue 324 (and/or other optional information, such as user profiles, message content, etc.). As shown, the optional access queue 324 maintains a plurality of sequential positions (e.g., 500-1, 500-2, 500-3, 500-4, 500-5, . . . ) for monitoring an order in which access requests of the user device 102 are received. Based on predefined selection criteria, user devices 102 are granted or denied access to the presentation device 108 based on the positions of their access requests with respect to the access queue 324. Selection criteria may, for example, specify that access be granted to a user device whose access request corresponds to position 500-1 of the access queue 324 (i.e., the first-received access request). Optionally, the selection criteria may include a list of user devices 102 that may not be permitted access to a presentation device 108, irrespective of their corresponding positions in the access queue 324 (e.g., a black list). Implementations of the access queue and selection criteria are described in greater detail with respect to the method 600 (FIG. 6).

In this example, user devices 102-1, 102-2, and 102-4 request access to the presentation device 108. Because the access request of user device 102-2 is received first, as indicated by its corresponding position 500-1 in access queue 324, the server system 104 grants the user device 102-2 access to the presentation device 108. Once access is granted, a user associated with user device 102-2 may speak into a microphone for the user device 102-2, thereby generating a data stream that includes the user's vocal input. The user device 102-2 transmits the data stream to the presentation device 108 for presentation (e.g., data stream is transmitted from the user device 102-2 to server system 104 via networks 112, which is then transmitted by the server system 104 to the presentation device 108 via networks 112; data stream is transmitted via a direct communications channel, such as Bluetooth; etc.).

Figure 6:
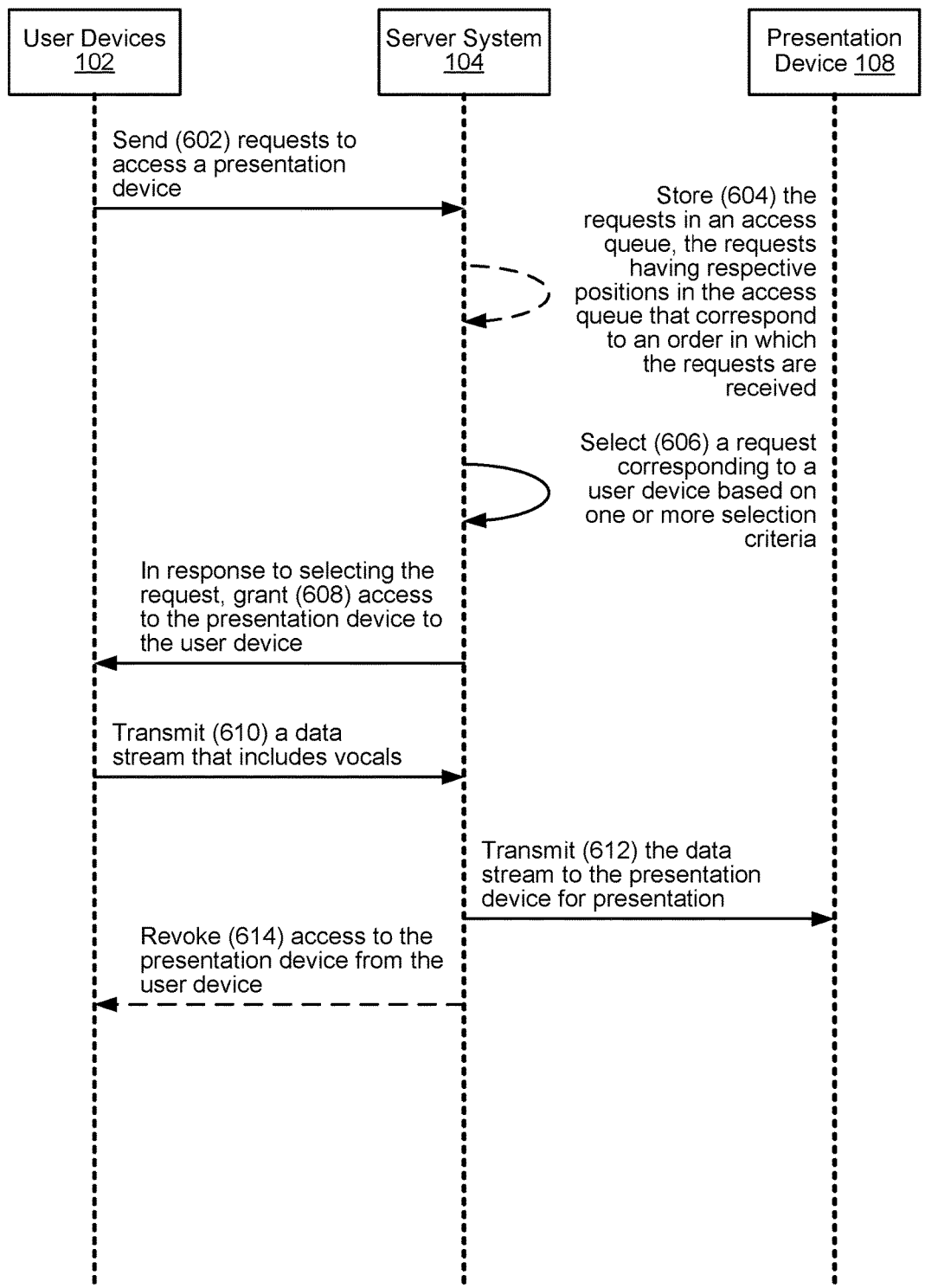
FIG. 6 is a flow diagram illustrating a method of controlling access to and presenting content on presentation devices based on selection criteria, in accordance with some implementations.

FIG. 6 is a flow diagram illustrating a method 600 of controlling access to and presenting content on presentation devices based on selection criteria, in accordance with some implementations.

The steps of the method 600 may be performed by any combination of one or more user devices 102 (FIGS. 1, 2, and 5), server systems 104 (FIGS. 1, 3, and 5), and/or presentation devices 108 (FIGS. 1, 4, and 5). FIG. 6 corresponds to instructions stored in computer memory (e.g., memory 212 of the user device 102, FIG. 2; memory 306 of the server system 104, FIG. 3; memory 412 of the presentation device 108, FIG. 4) or other computer-readable storage medium.

In performing the method 600, one or more user devices 102 send (602) to the server system 104 (and the server system 104 receives from the one or more user devices 102) one or more requests to access a presentation device (e.g., user devices 102-1, 102-2, and 102-4 each transmitting a request for access to the server system 104 via networks 112 (not shown), FIG. 5).

In some embodiments, the one or more requests include (or are sent with) message content to be presented by the presentation device (e.g., requests are sent with text, pre-recorded audio/video data, or other content that may otherwise be recorded/input and included in the data stream transmitted by a user device after access is granted).

In some embodiments, the presentation device 108 and the plurality of user devices 102 are not communicably connected independently of the server system (e.g., no direct data communications channels 112 are established between the presentation device 108 and user devices 102, FIG. 1). In some embodiments, at least two or more of the plurality of user devices and the presentation device are connected to a local network (e.g., a network 112 that is a LAN, FIG. 1).

In some embodiments, the server system 104 stores (604) the requests in an access queue (e.g., access queue 324, FIG. 5). The requests have respective positions in the access queue that correspond to an order in which the requests are received (e.g., access request from user device 102-2 having position 500-1 in the queue 324 indicating it was received first, access request from user device 102-4 having position 500-2 indicating it was received second, and access request from user device 102-1 having position 500-3 indicating it was received third, etc., FIG. 5).

The server system selects (606) a request corresponding to a user device based on one or more selection criteria. In response to selecting the request, the server system grants (608) access to the presentation device to the user device.

Selection criteria specify rules or conditions for selecting received access requests in order to grant or deny access to presentation devices to corresponding user devices. In some embodiments, the one or more selection criteria specify a position of a request (or positions of multiple requests) in the access queue. The user device whose access request corresponds to the specified position is granted access (or where positions of multiple access requests are specified, the user devices whose access requests correspond to the specified positions are granted access). For example, in some implementations, the position specified by the one or more selection criteria is a position that is first in the access queue (e.g., in FIG. 5, access is granted to user device 102-2, whose access request corresponds to position 500-1 of queue 324).

In some embodiments, selecting the request based on the one or more selection criteria comprises selecting the request at random from the received requests (e.g., employ a random selection algorithm to select a received request and grant access to a corresponding user device).

In some embodiments, selecting the request based on the one or more selection criteria comprises selecting the request in accordance with profiles of users (or user devices) associated with the received requests, wherein user profiles include information indicating a respective priority of associated users (e.g., requests of users whose profiles specify a high priority are assigned a first position in the queue regardless of the order in which the requests were received by the server system 104). Information included in user profiles may include a predefined priority (e.g., high priority), or other user attributes (e.g., organization role, title, group, etc.) that corresponds to a predefined priority.

In some embodiments, selecting the request based on the one or more selection criteria comprises selecting the request in accordance with message content received from the user devices 102 (e.g., text, pre-recorded audio/video data, or other content received before a respective device is considered for selection, such as message content received with the access requests). In some implementations, selecting the request in accordance with the message content is based on detection of predefined characters or character strings (e.g., keywords, phrases, etc.).

In some embodiments, the one or more selection criteria specify a list of one or more user devices that have previously been granted access to the presentation device. Furthermore, selecting the request based on the one or more selection criteria comprises disqualifying user devices in the specified list from being selected for access to the presentation device. Thus, in some implementations, a blacklist of user devices is maintained such that only those devices that have not previously been granted access to the presentation device 108 are qualified to be selected for access. In some embodiments, the user device is added to the specified list (e.g., the blacklist) after the granted access to the presentation device has expired (or alternatively, upon access to the presentation device being granted).

Selecting the request may also be performed based on a user input (e.g., received from the presentation device 108, from a user device 102 associated with an administrator/host of an event, etc.). In some implementations, the server system receives from the presentation device a user input indicating selection of a first request from the receiving requests. Selecting (606) the request is performed in accordance with the received user input, and the selected request is the first request (e.g., the host of an event manually selects an access request and grants access to a corresponding user device).

In some embodiments, the presentation device is located within a physical premises (e.g., a PA system presenting to a live audience at premises 110, FIG. 1), and the user device (that is granted access) is located outside of the physical premises (e.g., user device 102-*n*, located outside premises 110). Alternatively, the presentation device and the user device that is granted access are located within the same physical premises.

The user device that is granted access transmits (610) to the server system 104 (and the server system 104 receives from the user device) a data stream that includes vocals (e.g., user speech is recorded using a microphone of the user device that is granted access). The server system 104 transmits (612) to the presentation device 108 (and the presentation device 108 receives from the server system 104) the data stream for presentation. In some embodiments, the user device that is granted access to the presentation device is a mobile device (e.g., user device 102 in FIG. 2, a mobile phone), and the data stream including vocals is generated using a microphone of the mobile device (e.g., microphone 240).

Additionally and/or alternatively, the user device (that is granted access) transmits to the presentation device (and the presentation device receives from the user device) the data stream via a direct communications channel between the user device and the presentation device (e.g., user device 102-1 transmits a data stream directly to the presentation device 108 via communications channel 112-1, such as a Bluetooth channel, FIG. 1).

In some embodiments, the server system 104 revokes (614) access to the presentation device from the user device. In response to revoking access from the user device, the server system ceases to receive the data stream from the user device, and the server system ceases transmission of the data stream to the presentation device. In embodiments in which the data stream is transmitted from the user device (that is granted access) to the presentation device via a direct communications channel (e.g., communications channel 112-1, FIG. 1), the server system may send commands for: terminating the direct communications channel, terminating transmission of the data stream from the user device to the presentation device, denying receipt of the data stream from the user device, and/or ceasing presentation of the data stream by the presentation device.

Access to the presentation device may be revoked in accordance with a time limit. For example, in some implementations, the revoking (614) is performed once a predefined period of time has elapsed after access to the presentation device is granted to the user device (e.g., after 5 minutes) (or alternatively, after a predefined period of time has elapsed since commencing presentation of the data stream).

Revoking access may also be performed based on a user input (e.g., received from the presentation device 108, from a user device 102 associated with an administrator/host of an event, etc.). In some implementations, the server system receives (e.g., from the presentation device 108 or an associated user device with administrative privileges) a command to revoke access to the presentation device from the user device, wherein the revoking is performed in response to receiving the command.

In some embodiments, the data stream received from the user device (step 610) is a first data stream that includes vocals corresponding to a first language, and the data stream transmitted to the presentation device (step 612) is a second data stream. After receiving the first data stream and before transmitting the second data stream, the first data stream is processed to generate the second data stream that includes vocals corresponding to a second language. Thus, a data stream received from the user device 102 granted access may be translated into a different language (e.g., by stream processing module 326 of server system 104, FIG. 3) for presentation on the presentation device 108.

In some embodiments, the vocals of the data stream are transcribed (e.g., by stream processing module 326 of server system 104, FIG. 3) to generate a transcript, and the transcript is sent to the presentation device for display (e.g., transcribed and displayed in real-time, concurrently with presentation of the data stream that includes vocals).

In some embodiments, social network information (e.g., user information maintained by a social-networking service, such as user profile information, biographical data, etc.) is retrieved for a user associated with the user device that is granted access to the presentation device. The retrieved social network information is then provided to one or more devices (e.g., user devices 102) connected to the presentation device (additionally and/or alternatively, provided to the presentation device 108) for display while access to the presentation device is granted to the user device. Additionally and/or alternatively, social network information may be retrieved for one or more users associated with the received requests, and used to select (step 606) a request for granting access.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
    at a server system having one or more processors and memory storing instructions configured for execution by the one or more processors, wherein the server system is connected to a local area network (LAN):
        receiving requests from a plurality of user devices connected to the LAN to access a presentation device;
        selecting a request corresponding to a first user device of the plurality of user devices based on one or more selection criteria;
        granting, to the first user device, access to the presentation device, in response to selecting the request;
        after granting access to the first user device, receiving from the first user device a first data stream that includes speech captured by a microphone of the first user device;
        transmitting the first data stream to the presentation device for presentation;
        revoking access to the presentation device from the first user device;
        receiving requests from a second plurality of user devices connected to a network distinct from the local area network to access the presentation device;
        selecting a request corresponding to a second user device of the second plurality of user devices based on the one or more selection criteria;
        granting, to the second user device, access to the presentation in response to selecting the request;
        after granting access to the second user device, receiving from the second user device, a second data stream that includes speech captured by a microphone of the second user device; and
        transmitting the second data stream to the presentation device for presentation.

2. The method of claim 1, wherein the presentation device is located within a physical premises, and the first user device is located outside of the physical premises.

3. The method of claim 1, further comprising storing the requests from the first plurality of user devices in an access queue, each stored request having a respective position in the access queue that corresponds to an order in which the respective stored request was received at the server system; wherein the one or more selection criteria specify a position of requests in the access queue.

4. The method of claim 3, wherein the position specified by the one or more selection criteria is a position that is first in the access queue.

5. The method of claim 1, wherein selecting the request based on the one or more selection criteria comprises selecting the request at random from the received requests.

6. The method of claim 1, wherein selecting a request corresponding to a first user device comprises receiving from the presentation device a user input indicating the selection.

7. The method of claim 1, wherein:
    the one or more selection criteria specify a list of one or more user devices that have previously been granted access to the presentation device; and
    selecting the request based on the one or more selection criteria comprises disqualifying user devices in the specified list from being selected for access to the presentation device.

8. The method of claim 7, further comprising adding the first user device to the specified list after the granted access to the presentation device has expired.

9. The method of claim 1, further comprising:
    in response to revoking access from the first user device:
        ceasing to receive the first data stream from the first user device; and
        ceasing transmission of the first data stream to the presentation device.

10. The method of claim 1, wherein the revoking is performed once a predefined period of time has elapsed after access to the presentation device is granted to the first user device.

11. The method of claim 1, further comprising receiving a command to revoke access to the presentation device from the first user device;
    wherein the revoking is performed in response to receiving the command.

12. The method of claim 1, wherein the first data stream received from the first user device includes speech corresponding to a first language, and
    transmitting the first data stream to the presentation device comprises processing the first data stream to generate speech corresponding to a second language.

13. The method of claim 1, further comprising:
    transcribing the speech of the first data stream to generate a transcript; and
    sending the transcript to the presentation device for display.

14. The method of claim 1, further comprising:
    retrieving social network information for a user associated with the first user device that is granted access to the presentation device; and
    providing the retrieved social network information to one or more devices connected to the presentation device for display while access to the presentation device is granted to the first user device.

15. The method of claim 1, wherein:
    the first user device that is granted access to the presentation device is a mobile device.

16. A server system connected to a local area network (LAN), comprising:
    a processor; and
    memory storing one or more programs for execution by the processor, the one or more programs including instructions for:
        receiving requests from a plurality of user devices connected to the LAN to access a presentation device;
        selecting a request corresponding to a first user device of the plurality of user devices based on one or more selection criteria;

granting, to the first user device, access to the presentation device, in response to selecting the request;

after granting access to the first user device, receiving from the first user device a first data stream that includes speech captured by a microphone of the first user device;

transmitting the first data stream to the presentation device for presentation;

revoking access to the presentation device from the first user device;

receiving requests from a second plurality of user devices connected to a network distinct from the local area network to access the presentation device;

selecting a request corresponding to a second user device of the second plurality of user devices based on the one or more selection criteria;

granting, to the second user device, access to the presentation in response to selecting the request;

after granting access to the second user device, receiving from the second user device, a second data stream that includes speech captured by a microphone of the second user device; and transmitting the second data stream to the presentation device for presentation.

17. A non-transitory computer readable storage medium, storing one or more programs configured for execution by one or more processors, the one or more programs including instructions for:

receiving requests from a plurality of user devices connected to a local area network (LAN) to access a presentation device;

selecting a request corresponding to a first user device of the plurality of user devices based on one or more selection criteria;

granting, to the first user device, access to the presentation, in response to selecting the request;

after granting access to the first user device, receiving from the first user device a first data stream that includes speech captured by a microphone of the first user device;

transmitting the first data stream to the presentation device for presentation;

revoking access to the presentation device from the first user device;

receiving requests from a second plurality of user devices connected to a network distinct from the local area network to access the presentation device;

selecting a request corresponding to a second user device of the second plurality of user devices based on the one or more selection criteria;

granting, to the second user device, access to the presentation in response to selecting the request;

after granting access to the second user device, receiving from the second user device, a second data stream that includes speech captured by a microphone of the second user device; and transmitting the second data stream to the presentation device for presentation.

* * * * *